United States Patent
Hüther

(10) Patent No.: US 11,952,296 B2
(45) Date of Patent: Apr. 9, 2024

(54) WATER PURIFIER

(71) Applicant: Fabio and Markus Turbine Engineering GmbH, Freienbach (CH)

(72) Inventor: Fabio Hüther, Ermatingen (CH)

(73) Assignee: Fabio and Markus Turbine Engineering GmbH, Freienbach (CH)

( * ) Notice: Subject to any disclaimer, the term of this patent is extended or adjusted under 35 U.S.C. 154(b) by 405 days.

(21) Appl. No.: 17/435,445

(22) PCT Filed: Feb. 28, 2020

(86) PCT No.: PCT/EP2020/055358
§ 371 (c)(1),
(2) Date: Sep. 1, 2021

(87) PCT Pub. No.: WO2020/178200
PCT Pub. Date: Sep. 10, 2020

(65) Prior Publication Data
US 2022/0055925 A1 Feb. 24, 2022

(30) Foreign Application Priority Data
Mar. 1, 2019 (CH) .................. 00254/19

(51) Int. Cl.
*C02F 1/48* (2023.01)

(52) U.S. Cl.
CPC ........ *C02F 1/482* (2013.01); *C02F 2301/024* (2013.01); *C02F 2301/026* (2013.01); *C02F 2303/22* (2013.01); *C02F 2307/06* (2013.01)

(58) Field of Classification Search
None
See application file for complete search history.

(56) References Cited

U.S. PATENT DOCUMENTS 6,752,923 B1 * 6/2004 Jans .................. C02F 1/482
210/695

FOREIGN PATENT DOCUMENTS

| DE | 19519715 | 12/1996 |
|----|----------|---------|
| DE | 102004001059 | 6/2005 |
| FR | 2128678 | 10/1972 |

* cited by examiner

*Primary Examiner* — Peter Keyworth
(74) *Attorney, Agent, or Firm* — Volpe Koenig

(57) ABSTRACT

The water purifier includes a nozzle (9) in a jacket pipe (1). At least one inlet bore (21) connects an inlet-side section of the jacket pipe (1) to a turbulence chamber (19), which is open towards an outlet-side section of the jacket pipe (1). When flowing through the inlet bore (21), a water stream is deflected and is swirled in the turbulence chamber (19). The rotating water stream subsequently passes through the magnetic field of at least one magnet (11). This efficiently prevents deposits of limestone or scale.

11 Claims, 3 Drawing Sheets

WATER PURIFIER

TECHNICAL FIELD

The invention relates to a water purifier, a device comprising a water pipe, and a method for purifying tap water.

BACKGROUND

Hard drinking or industrial water can carry unwanted deposits of lime, in particular in pipes, devices, and at locations where this water evaporates. If hard water is heated up to over 60° C., the formation of limestone or scale is heavily promoted. In general, hardness-causing salts are dissolved in water in ionized form. When depositing, positively and negatively charged ions form into lattices or crystals, respectively.

It is known that magnetic fields can influence the crystal formation. Constantly changing forces can in particular be exerted on the ions, which are dissolved in the water, by means of electromagnetic alternating fields. This makes the formation of larger crystals more difficult. Due to inhomogeneities, microcrystals cannot integrate themselves well in the lattice structure of the crystals. Lime deposits of water, which has been treated with electromagnetic alternating fields, therefore have lower adhesive forces.

The necessary provision of electrical energy is a disadvantage of the water treatment with electromagnetic alternating fields.

A water purifier, which works without electrical energy, is known from DE19519715A1. Following an inlet, a funnel is arranged in a housing. The inner diameter of this funnel is largest on the inlet side. At this point, the diameter of the funnel is in particular larger than the inner diameter of the inlet. On the output side, the funnel has a smaller inner diameter, which essentially corresponds to the inner diameter of a following activation pipe section. The activation pipe section is surrounded by two half shell-shaped permanent magnets comprising an internal magnetic south pole. An outflow subsequently follows the activation pipe section. The inner diameters of the infeed and of the outflow essentially correspond to the inner diameter of the activation pipe section.

A conically bent spiral spring of spring wire is arranged so as to abut against the inner side of the funnel. Due to the constriction in the funnel, the flow speed of water streaming in is increased. The spiral structure effects a swirling of the water stream. The water stream is subsequently guided through the magnetic field with high flow speed.

Due to the increased flow speed, the water flow is subjected to the magnetic field only for a comparatively short time. The effect of the spiral structure takes place only near the funnel wall. In the case of small flow speeds, the swirling effect of the spiral structure is small. Lime and dirt particles can deposit at the spiral.

SUMMARY

An object of the present invention thus lies in creating an alternative water purifier and a method for purifying water, which provide for an effective purification of flowing water without the supply of electrical energy, and which make the formation of limestone more difficult.

This object is solved by the use of one or more of the features disclosed herein.

The water purifier according to the invention comprises a swirl nozzle, nozzle for short, which is arranged in a flow-through chamber and which provides for a comparatively strong swirling of the water stream in a simple manner. In a flow channel of the swirl nozzle, the water stream is deflected from an axial flow direction and is converted into a rotating stream. In an output-side section of the nozzle, the free flow cross section of the flow channel increases in a funnel-like manner in the axial direction. One or several magnets, which are peripherally arranged at the flow-through chamber, act on the water stream in this region and/or further downstream. Several magnets are preferably arranged such that the magnetic flux density in the flow-through chamber has locally large differences. The nozzle is preferably made of a material, which does not influence or only insignificantly influences the magnetic flux density. The increasing flow cross section effects a pressure change in the water stream, which intensify the effect, which the magnets exert on charged or polar particles in the water stream.

At and/or downstream from the output-side end of the funnel opening, a portion of the rotating water stream is guided past near the magnets, where the magnetic flux density is particularly large.

In combination with one another, the strong swirling of the water stream, pressure changes due to different flow cross sections, and locally different intensities of the magnetic flux density effect quickly changing forces, which act differently on positively and negatively charged ions. This prevents the regular arrangement of ions in a crystal lattice very effectively. Even in response to small flow speeds in the axial direction, the nozzle effects a strong swirling of the water stream. This is promoted in that the entire water stream in the nozzle is deflected from the axial flow direction. In addition, the rotational speed of the flow can be influenced by the selection of suitable diameters of entry openings of the nozzle. Smaller cross sections of entry openings effect higher rotational speeds. Nozzles can thus be scaled and optimized according to the expected flow speeds in the case of different applications. Water purifiers comprising such nozzles can be optimized for the installation into devices, such as, e.g., coffee makers, washing machines, or dishwashers. Possible further applications are, for example, water pipes in buildings, wherein the installation into a water pipe can take place at any point of the water supply network, for example in the vicinity of a building connection, upstream of a boiler, or decentralized at one or several water outlets.

BRIEF DESCRIPTION OF THE DRAWINGS

The invention will be described in more detail below on the basis of several figures, in which.

DETAILED DESCRIPTION

Figure 1:
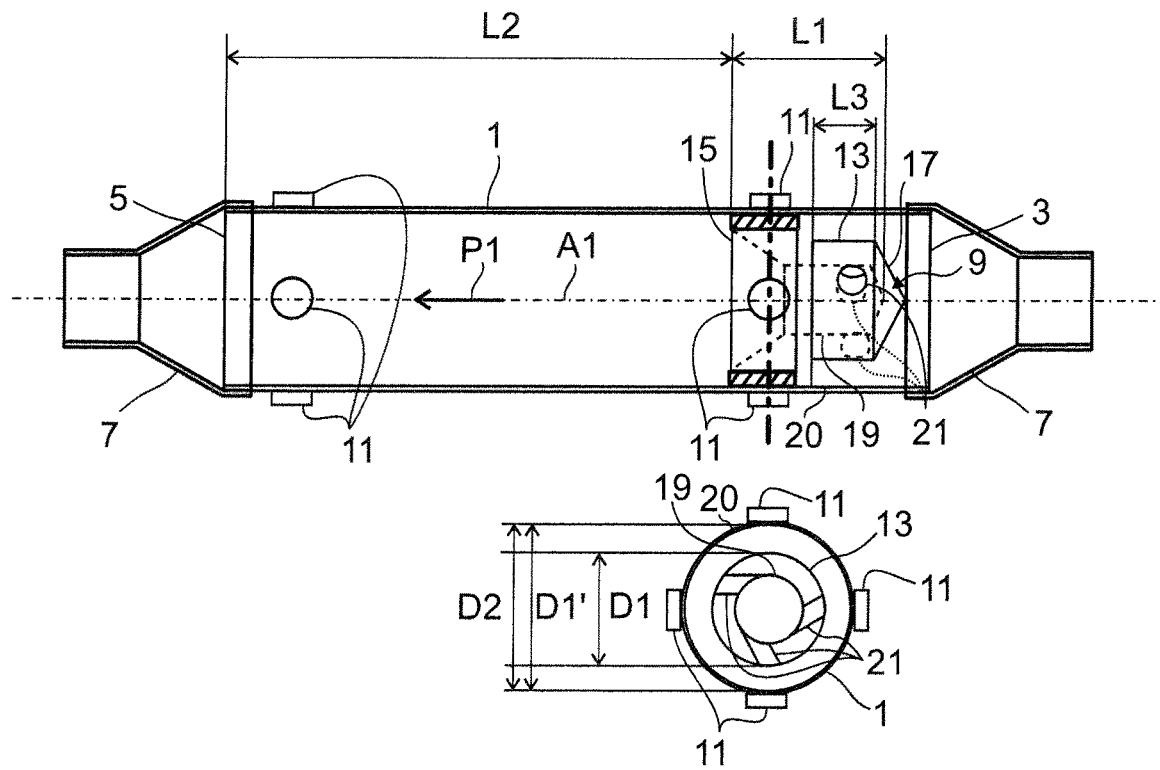
FIG. 1 shows a longitudinal section and a cross section of a water purifier.

FIG. 1 shows a longitudinal section and a cross section of an exemplary embodiment of a water purifier. The water purifier comprises a preferably cylindrical jacket pipe 1 comprising an inlet opening 3 and an outlet opening 5. They define a primary flow direction illustrated by an arrow P1 within the jacket pipe 1 in the direction of the jacket pipe axis A1, wherein water streams through the inlet opening 3 into the jacket pipe 1, and streams out through the outlet opening 5. The jacket pipe 1 can be connected to adjacent pipe sections of a water pipe (not illustrated), e.g. by fittings 7. If necessary, fittings can bridge different outer or inner diameter of the water pipe and of the jacket pipe 1.

Figure 2:
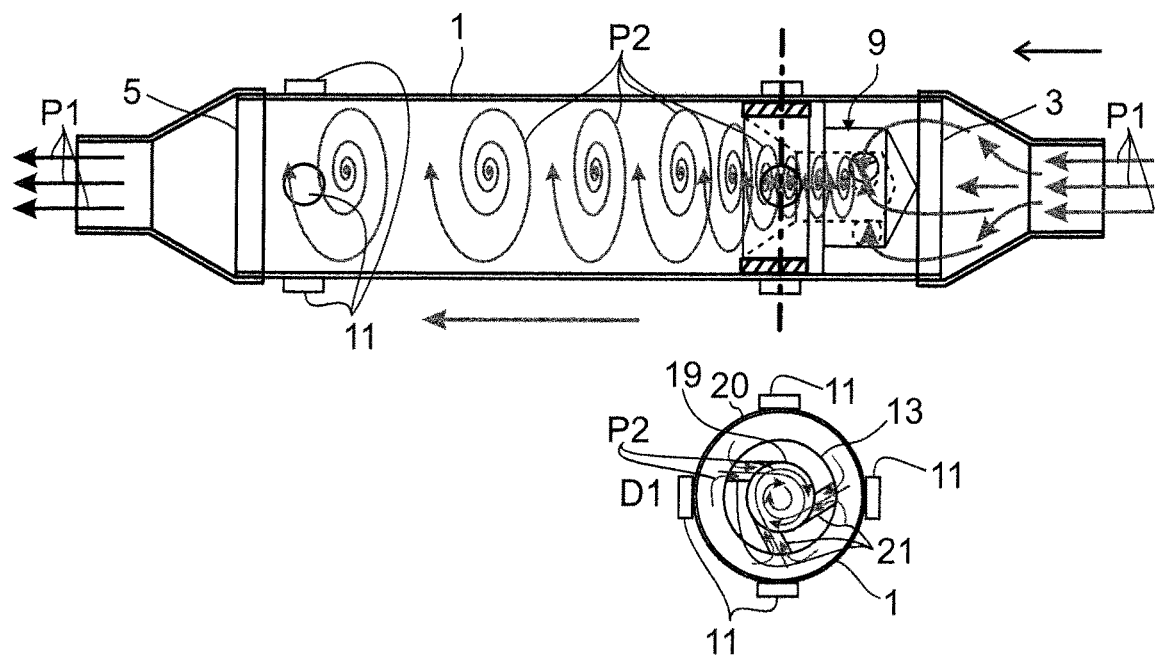
FIG. 2 shows the arrangement from FIG. 1 with additional flow arrows.

FIG. 2 shows the arrangement from FIG. 1, wherein the rotating secondary flow direction is additionally illustrated by spiral arrows P2.

In the interior of the jacket pipe 1, a nozzle 9 is arranged between an inlet-side section and an outlet-side section of the jacket pipe 1. The nozzle 9 comprises a nozzle pipe 13 comprising a mouth opening 15 in the outlet-side or rear section, respectively, of the jacket pipe 1.

The inlet-side or front end, respectively, of the nozzle pipe 13 is closed by an inflow cap 17.

The interior, which is encased by the nozzle pipe 13, limits a rotationally symmetrical turbulence chamber 19 over a length L1. The axis of symmetry of the turbulence chamber 19 corresponds to the axis A1 of the jacket pipe 1. The turbulence chamber 19 is extended by a length L2 by the section of the jacket pipe 1, which connects to the nozzle 9 on the outlet side. In an inlet-side or front section respectively, the nozzle pipe 13 has an outer diameter D1, which is smaller than the inner diameter D2 of the jacket pipe 1 in this region. In this region, the walls of the nozzle pipe 13 and of the jacket pipe 1 limit an annular space 20, which is open towards the inlet opening 3.

In an outlet-side or rear section respectively, of the nozzle pipe 13, adjacent to the annular space 20 the outer diameter D1' thereof essentially corresponds to the inner diameter D2 of the jacket pipe 1 in this region. The rear section of the nozzle pipe 13 is tightly connected to the jacket pipe 1 in a non-positive manner, in a positive manner, or by a substance-to-substance bond, e.g. by pressing in or screwing or by another suitable joining technique.

In the front section of the nozzle pipe 13, the wall thereof comprises at least one continuous inlet bore 21. In the case of the embodiment illustrated in FIG. 1, the nozzle pipe 13 comprises three inlet bores 21, which are arranged in an evenly distributed manner. Each of these inlet bores 21 connects the annular space 20 and thus the inlet-side section of the jacket pipe 1 to the turbulence chamber 19, which is open towards the outlet-side section of the jacket pipe 1. Each inlet bore 21 is preferably arranged and aligned such that it leads tangentially into the turbulence chamber 19. This has the effect that water streaming through the inlet openings 21 into the turbulence chamber 19 is swirled efficiently. A secondary flow direction, which rotates around the jacket pipe axis A1, is thereby imparted to the water stream by the deflection.

If the nozzle pipe 13 comprises more than one inlet bore 21, they are preferably arranged rotationally symmetrically. With respect to the axis of symmetry A1, they therefore have the same axial position. In the alternative, such inlet bores 21 can also be arranged axially offset to one another.

Figure 3:
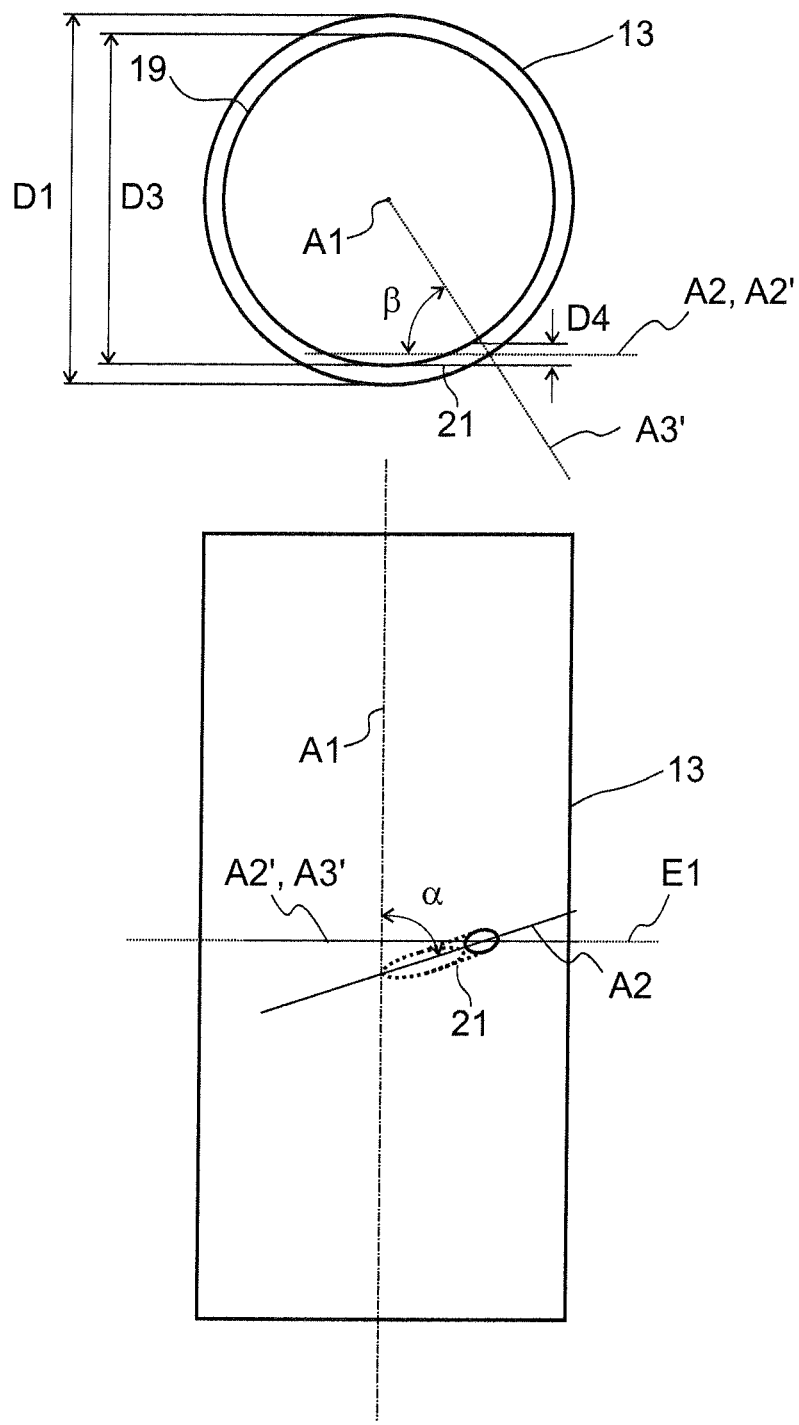
FIG. 3 shows a cross section and a side view of a nozzle pipe in the region of an inlet bore.

As illustrated in FIG. 3, the axes A2 of the inlet bores 21 can be arranged at an angle of inclination α, which is preferably 90° or less, and which can in particular lie in the range of approximately 60° to approximately 90°, relative to the direction of the axis of symmetry A1. The angle of inclination α can be specified individually for each inlet bore 21. Angles of inclination α can also have values, which are greater than 90°. This has the effect that a portion of flow opposite to the primary flow direction P1 is applied to water streaming through the respective inlet bores 21.

In addition, an individual orientation angle β can be specified for each inlet bore 21. The orientation angle β is that angle, which the projection A2' of the axis A2 of the inlet bore 21 and the axis A3' of a fictitious radial bore draw at the same entry point of the nozzle pipe 13 in a normal plane E1 to the axis of symmetry A1.

All inlet bores 21 preferably have the same diameter D4. In the alternative, the diameter D4 of each of the inlet bores 21 can also be specified individually. The water purifier can comprise, for example, a jacket pipe 1 with an inner diameter D2 of 22 mm. On the inflow side, the nozzle pipe 13 of such a water purifier typically has an outer diameter D1 in the range of approximately 12 mm to approximately 18 mm, and a wall thickness in the magnitude of approximately 2.5 mm to 3.5 mm, or an inner diameter D3 of approximately 7 mm to 12 mm, respectively. The width of the annular space 20, through which water can stream into the inlet bores 21, therefore lies in the range of approximately 2 mm to 5 mm. The length L3 of the annular space 20 can lie, for example, in the magnitude of approximately 6 mm to 8 mm. In the case of such nozzles 9, the diameter D4 of the inlet bores 21 typically lies in the range of approximately 2 mm to 5 mm. The length L1 of the turbulence chamber 19 typically lies in the magnitude of approximately 15 mm to 25 mm. On the inflow side, the inner diameter D3 or generally the free flow cross section of the nozzle pipe 13, respectively, is constant over a length of approximately two-thirds of the turbulence chamber length L1. Following this, the inner diameter D3 increases in a funnel-like manner. As illustrated in the longitudinal section in FIG. 1, the wall of the funnel can be linear or, in the alternative, concavely or convexly curved (not illustrated). The expansion of the flow cross section can thereby take place continuously or gradually. The shape of the funnel is a geometric parameter, by which the effect of the nozzle 9 on the water stream can be influenced.

Adjacent to the nozzle 9, the flow cross section is determined by the inner diameter D2 of the jacket pipe 1. Geometric parameters of the nozzle 9, in particular also the number, size, arrangement, and alignment of the inlet bores 21, in addition to the inflow-side water pressure, are a determining factor for how a water stream is influenced by the nozzle 9. They have an effect on factors, such as rotational speeds, pressure and degree of turbulence of the water stream in and downstream from the turbulence chamber 19.

In the case of jacket pipes 1 with other inner diameters D2, the above-specified typical values or value ranges, respectively, of the geometric parameters can in particular be proportionally adapted according to the desired effect on the water stream.

The length L2 of the output-side section of the jacket pipe 1 can generally be selected freely and, if necessary, can be tailored to different requirements for the installation of the water purifier into a water pipe or a water purification plant.

The nozzle 9 is preferably arranged near the inlet opening 3 of the jacket pipe 1. This facilitates the installation and the fastening of the nozzle 9 in the jacket pipe 1.

The water purifier comprises a magnet assembly comprising at least one permanent magnet 11, henceforth also magnet 11 for short. Each magnetic 11 is fastened on the outside of the jacket pipe 1, e.g. adhesively secured or held by a holding or clamping device, such as, for example, an elastic sleeve. The jacket pipe 1 and the magnet assembly are preferably encased by a housing or a protective cover (not illustrated).

Each magnet 11 is arranged in the region of the nozzle 9 or in the outlet-side section of the jacket pipe 1. Several magnets 11 are preferably fastened on the outside of the jacket pipe 1 so as to be distributed axially and/or circularly.

Magnets 11, which are located diametrically opposed in pairs, can in particular be arranged at the jacket pipe 1.

The magnets 11 can be cost-efficient round magnets. In the alternative, the water purifier can also comprise magnets 11 with other designs. The jacket pipe 1 is generally formed cylindrically. In the alternative, the outer side of the jacket pipe 1 can be a polygonal profile, which comprises, for example, four to eight flat surface sections for the simple fastening of the magnets 11 in a specified position (not illustrated).

In the case of the embodiment of the water purifier illustrated in FIG. 1, four magnets 11 are in each case arranged on the outside of the jacket pipe 1 so as to each be offset by 90° to one another in the region of the nozzle pipe 13 at the funnel-shaped expansion of the turbulence chamber 19 as well as in the direction of the jacket pipe axis A1 spaced apart therefrom at the outlet opening 5. Polar and/or charged particles of the rotating water stream thus pass through two zones, in which the direction and intensity of the magnetic flux density have locally large differences. Quickly changing forces and/or torques thus act on these particles.

Figure 4:
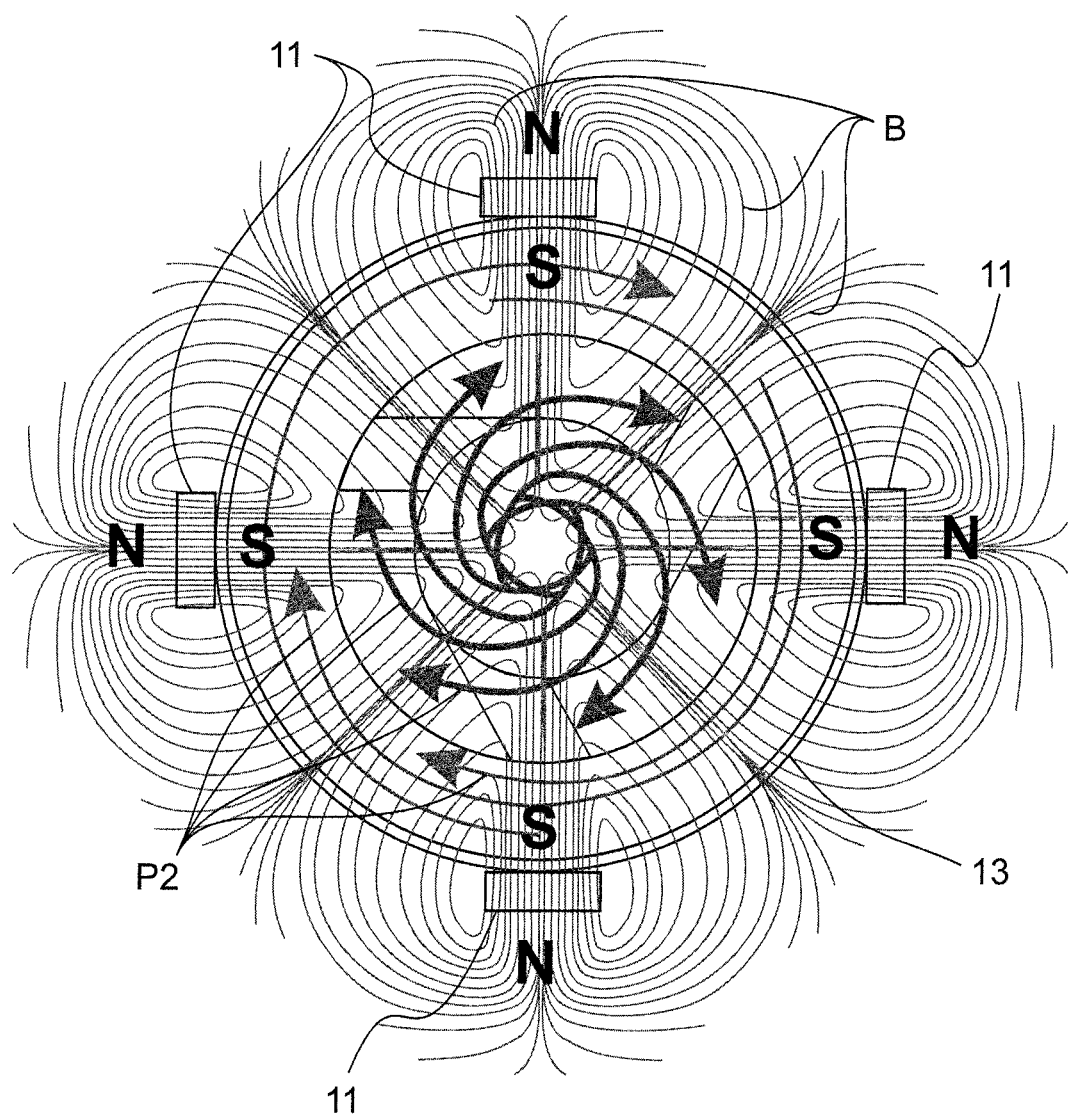
FIG. 4 shows a cross section of the water purifier from FIG. 1 in the region of the swirl nozzle with magnetic field lines and flow arrows.

FIG. 4 shows a cross section of the water purifier in the first zone in an exemplary manner, wherein the turbulent flow in the funnel of the turbulence chamber 19 and in the outlet-side section of the jacket pipe 1 is illustrated by flow arrows P2. All of the magnetic south poles of the four magnets 11 identified with S face the jacket pipe 1. In the alternative, all magnetic north poles N could also face the jacket pipe 1. In addition, the field lines B of the magnetic flux density are also illustrated in FIG. 4. For each full rotation, each particle in the rotating water stream passes eight times through alternating regions with high and with low flux density. Within the jacket pipe 1, the field lines B are aligned essentially at least approximately radially and thus orthogonally to the rotating water stream. The forces or torques, respectively, acting on charged and/or polar particles can thus be maximized. In the case of each flux density maximum, the direction flux density additionally changes between radially to the inside and radially to the outside.

The nozzle 9 is preferably formed integrally. It is generally made of a non-ferromagnetic or only slight ferromagnetic material, for example of aluminum bronze or plastic. Magnets 11 can thus also be arranged in the region of the nozzle 9, where the effect on charged and polar particles is particularly advantageous.

The invention claimed is:

1. A water purifier, comprising:
    a jacket pipe (1) comprising an inlet opening (3) and an outlet opening (5),
    a nozzle (9) arranged in the jacket pipe (1),
    a magnet assembly comprising at least one magnet (11) arranged at the jacket pipe,
    the nozzle (9) comprises a nozzle pipe (13), which limits a turbulence chamber (19) that includes an outlet-side mouth opening (15),
    an inlet-side end of the nozzle pipe (13) is closed by an inflow cap (17), and
    a wall of the nozzle pipe (13) comprises at least one inlet bore (21), which connects an inlet-side section of the jacket pipe (1) to the turbulence chamber (19), which is open towards an outlet-side section of the jacket pipe (1).

2. The water purifier as claimed in claim 1, wherein a flow cross section of the at least one inlet bore (21) is smaller than a flow cross section of the outlet-side mouth opening (15) of the nozzle pipe (13).

3. The water purifier as claimed in claim 1, wherein an inner diameter (D3) of the nozzle pipe (13) expands towards the mouth opening (15) in a funnel-shaped manner.

4. The water purifier as claimed in claim 1, wherein the at least one inlet bore (21) leads tangentially into the turbulence chamber (19).

5. The water purifier as claimed in claim 1, wherein the inlet bore (21) is arranged inclined to an axis (A1) of the jacket pipe (1) at an angle of inclination α of 60° to 90°.

6. The water purifier as claimed in claim 1, wherein the at least one inlet bore comprises several of the inlet bores (21) arranged evenly distributed at the nozzle pipe (13).

7. The water purifier as claimed in claim 1, wherein the at least one magnet (11) is arranged on an outer side of the jacket pipe (1) in the outlet-side section of the jacket pipe (1) or in a region of the nozzle (9).

8. The water purifier as claimed in claim 1, wherein the at least one magnet comprises several magnets (11) arranged at the jacket pipe (1) in an evenly distributed manner in at least one of a region of the nozzle (9) or in the outlet-side section of the jacket pipe (1).

9. A device comprising a water pipe and the water purifier as claimed in claim 1.

10. A method for purifying tap water using the water purifier as claimed in claim 1, the method comprising: deflecting a water stream in the jacket pipe (1) is when the water stream flows through the at least one inlet bore (21), converting the water stream into a turbulent flow in the turbulence chamber (19), and passing the turbulent flow through a static magnetic field of the at least one magnet.

11. The method as claimed in claim 10, wherein the turbulent flow passes through the magnetic field of one or several of the magnets (11) in at least one of a region of the turbulence chamber (19) or further downstream in the outlet-side section of the jacket pipe (1).

* * * * *